(12) United States Patent  
Shor

(10) Patent No.: US 8,160,509 B2
(45) Date of Patent: Apr. 17, 2012

(54) APPARATUS FOR COUPLING A WIRELESS COMMUNICATION DEVICE TO A PHYSICAL DEVICE

(75) Inventor: Arie Shor, Sunnyvale, CA (US)

(73) Assignee: Qualcomm Atheros, Inc., San Jose, CA (US)

( * ) Notice: Subject to any disclaimer, the term of this patent is extended or adjusted under 35 U.S.C. 154(b) by 1052 days.

(21) Appl. No.: 12/059,970

(22) Filed: Mar. 31, 2008

(65) Prior Publication Data

US 2008/0248759 A1 Oct. 9, 2008

Related U.S. Application Data

(60) Provisional application No. 60/910,624, filed on Apr. 6, 2007.

(51) Int. Cl.
 *H04B 1/44* (2006.01)
(52) U.S. Cl. .......................... 455/78; 455/557; 455/559
(58) Field of Classification Search .................. 455/78, 455/557, 559
See application file for complete search history.

(56) References Cited

U.S. PATENT DOCUMENTS

| 7,813,451 B2 * | 10/2010 | Binder et al. ................. 375/316 |
| 2003/0193923 A1 | 10/2003 | Abdelgany et al. |
| 2004/0151503 A1 | 8/2004 | Kashima et al. |
| 2005/0100043 A1 * | 5/2005 | Binder .......................... 370/463 |
| 2005/0249245 A1 | 11/2005 | Hazani et al. |

OTHER PUBLICATIONS

International Search Report and Written Opinion—PCT/US2008/059042, ISA/US, Jun. 26, 2008.

* cited by examiner

*Primary Examiner* — Yuwen Pan
(74) *Attorney, Agent, or Firm* — Bever, Hoffman & Harms, LLP

(57) ABSTRACT

A wireless communication device may be configured to transmit and receive data through a physical device, such as a cable. Relatively higher transmit radio frequency (RF) signals from the wireless communication device may be shifted to a relatively lower frequency, thereby enabling the relatively lower frequency signals to be carried by the physical device. Similarly, relatively lower frequency signals from the physical device may be shifted to relatively higher frequencies, thereby enabling the wireless communication device to receive the signals from the physical device. In one embodiment, the frequency of the RF signals may be between 2.3 and 2.7 GHz and the frequency of the relatively lower frequency shifted signals may be between 900 and 1100 MHz.

23 Claims, 9 Drawing Sheets

| ID | Value | ID | Value | ID | Value |
|---|---|---|---|---|---|
| 201 | 3.3 pF | 321 | 10 pF | 414 | 2 nH | 
| 202 | Printed BFP | 322 | 2 nH | 415 | 1.2 pF |
| 202 | 3.3 pF | 323 | 1.2 pF | 416 | 18 nH |
| 204 | 3.3 pF | 324 | 15 nH | 417 | 2 nH |
| 301 | 3 k | 325 | 2 nH | 418 | 10 pF |
| 302 | 5.6 k | 326 | 10 pF | 419 | 10 k |
| 303 | 10 k | 327 | 1.8 pF | 420 | 3.9 k |
| 304 | 1.8 pF | 328 | 8.2 nH | 421 | 10 k |
| 305 | 3.9 nH | 329 | 2.7 nH | 422 | 2N3904 |
| 306 | 2.7 pF | 401 | 2N3906 | 423 | 33 pF |
| 307 | 1.8 pF | 402 | 5.1 k | 424 | 1 pF |
| 308 | 22 nH | 403 | 22 | 425 | XX |
| 309 | 0.01 uF | 404 | 0.01 uF | 426 | 2N3906 |
| 310 | 33 pF | 405 | 10 k | 427 | 1 k |
| 311 | 2.7 pF | 406 | 22 pF | 428 | 2.7 nH |
| 312 | BFP 420 | 407 | 2.7 nH | 429 | XX |
| 313 | 22 pF | 408 | 1 pF | 430 | BFP 450 |
| 314 | 22 nH | 409 | 22 nH | 431 | 3.3 nH |
| 315 | 51 | 410 | 22 pF | 432 | 0.01 uF |
| 316 | 6.8 nH | 411 | BFP 640 | 433 | 2.2 |
| 317 | 200 | 412 | 1 pF | 434 | 22 nH |
| 318 | 5.6 nH | 413 | 10 pF | 435 | 33 pF |
| 319 | 1.2 pF | | | | |
| 320 | XX | | | | |

| ID | Value |
|---|---|
| 436 | XX |
| 437 | D902SMS7630-079 |
| 438 | 10 nH |
| 439 | 10 nH |
| 440 | 0.5 pF |
| 441 | 3.3 pF |
| 442 | 22 pF |
| 443 | 22 k |
| 444 | 51 |
| 445 | 0.5 pF |
| 446 | 6.8 pF |
| 447 | 5.6 nH |
| 448 | 3.3 pF |
| 449 | 0 |
| 501 | 0 |
| 502 | 0.01 uF |
| 503 | 22 |
| 504 | 10 k |
| 505 | 22 pF |
| 506 | 2.7 nH |
| 507 | 22 nH |
| 508 | 22 pF |
| 509 | BFP 640 |

FIG. 8A

| | | | | | | |
|---|---|---|---|---|---|---|
| 510 | 10 pF | 602 | 6.8 nH | 703 | 390 pF | 725 | 2.2 pF |
| 511 | 2 nH | 603 | 1.2 pF | 704 | 0.1 uF | 726 | 2.2 pF |
| 512 | 1.2 pF | 604 | 3 k | 705 | 100 pF | 727 | 30 |
| 513 | 2N 3906 | 605 | 5.6 nH | 706 | 1000 pF | 728 | 150 |
| 514 | 10 k | 606 | 7.5 k | 707 | 0.1 uF | 729 | XX |
| 515 | XX | 607 | 7.5 k | 708 | LMX2326TM | 730 | 0.1 uF |
| 516 | XX | 608 | 33 pF | 709 | 0.1 uF | 731 | 15 pF |
| 517 | 15 nH | 609 | 6.8 nH | 710 | 1000 pF | 732 | XX |
| 518 | 2 nH | 610 | 0.01 uF | 711 | 22 pF | 733 | 3 k |
| 519 | 10 pF | 611 | 22 nH | 712 | 150 | 734 | 10 k |
| 520 | 22 pF | 612 | BFP 420 | 713 | 75 | 735 | 22 nH |
| 521 | XX | 613 | 22 pF | 713A | 39 | 736 | 3.3 nH |
| 522 | XX | 614 | 22 nH | 714 | 75 | 736A | 2.2 pF |
| 523 | SOD 80 | 615 | 220 | 715 | 0.01 uF | 737 | 15 |
| 524 | 22 pF | 616 | 3.9 nH | 716 | 22 | 738 | 0.01 uF |
| 525 | XX | 617 | 2.7 pF | 717 | 10 k | 739 | 22 pF |
| 526 | XX | 618 | XX | 718 | 22 pF | 740 | BFP 420 |
| 527 | XX | 619 | 3.3 pF | 719 | 2.7 nH | 741 | 22 nH |
| 528 | 22 pF | 620 | Printed BFP | 720 | 22 nH | 742 | 51 |
| 529 | XX | 621 | 3.3 pF | 721 | 22 pF | 743 | 5.6 pF |
| 530 | XX | 622 | 3.3 pF | 722 | SGA8343 | 744 | 10 k |
| 531 | XX | 701 | 3.9 k | 723 | 0.75 pF | 745 | SMV 1247-079 |
| 601 | 5.6 nH | 702 | 1500 pF | 724 | 3.3 nH | 746 | 33 pF |
| | | | | | | 747 | 22 nH |

APPARATUS FOR COUPLING A WIRELESS COMMUNICATION DEVICE TO A PHYSICAL DEVICE

RELATED APPLICATIONS

This application claims priority of U.S. Provisional Patent Application 60/910,624, entitled "Apparatus For Coupling A Wireless Communication Device To A Physical Device" filed Apr. 6, 2007.

BACKGROUND OF THE INVENTION

1. Field of the Invention

Embodiments of the present invention generally relate to wireless communications and more particularly to coupling a wireless communication device to a physical device.

2. Description of the Related Art

Wireless communication systems are commonly used to transfer data between two or more devices. Wireless communication systems typically convert transmit baseband digital data into transmit radio frequency (RF) data and receive RF data into receive baseband digital data. Transmit RF data may be transmitted from one wireless communication system to one or more wireless communication systems, thereby sending data from one wireless communication system to another. Similarly, receive RF data may be received by a wireless communication system and converted into receive baseband digital data. Wireless communication systems may be coupled to processing devices such as computers, servers, routers, personal digital assistants, and the like. Thus, data may be transferred from one processing device to another processing device through wireless communication systems.

Wireless communication systems may have relatively high data transfer rates. The operation of wireless communication systems may be governed by standards, such as the IEEE 802.11 family of wireless communication standards. Such standards may describe how wireless communication systems may be configured to support relatively high data transfer rates. Furthermore, wireless communication systems may be designed and built around wireless communication devices, such as specially designed wireless communication integrated circuits. Such integrated circuits may have a relatively low-cost, thereby making the cost of the wireless communication system relatively low-cost as well. Thus, wireless communication systems may have a relatively high data transfer rates and a relatively low-cost.

In some areas, there may be little or no wireless communication infrastructure. There may be areas, for example, that lack wireless communication infrastructure, but instead have a physical infrastructure for communications. One example of a physical infrastructure is a cable-based infrastructure in which data is carried through a cable instead of being transmitted and received through the air. However, users may still desire relatively high data transfer rates when using a physical infrastructure. Unfortunately, the cost of the components that couple processing devices to a physical infrastructure while retaining such high data transfer rates may be relatively high.

Therefore, a need arises for a relatively low cost communication system that can transfer data at relatively high data rates through a physical infrastructure.

SUMMARY OF THE INVENTION

An external data transceiver for coupling between a wireless communication device and a physical device is described. This external data transceiver can include a transmit circuit and a receive circuit. The transmit circuit can frequency shift a received signal having a first frequency from the wireless communication device to a second frequency receivable by the physical device. The receive circuit can frequency shift a received signal having a third frequency from the physical device to a fourth frequency receivable by the wireless communication device. The external data transceiver can also include a switch for selectively coupling the transmit circuit and/or the receive circuit to the physical device In one embodiment, the transmit circuit can include a bandpass filter, a transmit mixer, a second bandpass filter, a driver amplifier, a third bandpass filter, a power booster, and coupler low pass filter connected in series between the wireless communication device and the physical device. The transmit mixer can advantageously mix the filtered signal from the first bandpass filter with a local oscillator signal, thereby generating a second frequency signal that is receivable by the physical device.

In one embodiment, the receive circuit can include a low noise amplifier (LNA), a first bandpass filter, a receive mixer, and a second bandpass filter connected in series between the physical device and the wireless communication device. The receive mixer can advantageously mix the filtered signal from the first bandpass filter with a local oscillator signal, thereby generating a second frequency signal that is receivable by the wireless communication device.

In accordance with another embodiment, an external data transceiver for coupling between a wireless communication device and a physical device is described. This external data transceiver can include a transmit circuit for frequency shifting a 2.3-2.7 GHz frequency signal from the wireless communication device to a 900-1100 MHz frequency signal receivable by the physical device. The data transceiver can also include a receive circuit for frequency shifting a 900-1100 MHz signal from the physical device to a 2.3-2.7 GHz frequency signal receivable by the wireless communication device. A synthesizer can generate a 1350-1650 MHz signal for mixing with the 2.3-2.7 GHz frequency signal and/or the 900-1100 MHz frequency signal. In one embodiment, the physical device is a cable.

A method for allowing communication between a wireless communication device and a physical device is also described. In this method, a received signal having a first frequency from the wireless communication device can be frequency shifted to a second frequency receivable by the physical device. Additionally, a received signal having a third frequency from the physical device can be frequency shifted to a fourth frequency receivable by the wireless communication device. The method can further include selectively allowing only one frequency shifting (i.e. from the wireless communication device to the physical device or from the physical device to the wireless communication device) to occur at any point in time.

With respect to frequency shifting from the wireless communication device to the physical device, the received signal from the wireless communication device can be filtered a first time, mixed with a local oscillator signal, filtered a second time, amplified, filtered a third time, boosted, filtered a fourth time, and then provided to the physical device. With respect to frequency shifting from the physical device to the wireless communication device, the received signal from the physical device can be amplified, filtered a first time, mixed with a local oscillator signal, filtered a second time, and then provided to the wireless communication device.

BRIEF DESCRIPTION OF THE DRAWINGS

FIGS. 8A and 8B are tables listing implementation values for exemplary components for one embodiment of the external data transceiver of FIG. 1.

DETAILED DESCRIPTION OF THE DRAWINGS

A wireless communication device typically receives and transmits radio frequency (RF) data via its antenna ports. The wireless communication device uses its internal transmit and receive chains (which are connected to such antenna ports) to appropriately process the RF signals for transmitting and receiving. Notably, a wireless communication device is typically connected to one or more processing devices (e.g. a user's computer, personal digital assistant (PDA), etc.). The data transfer rates associated with the wireless communication device and such processing device(s) are typically considered relatively high.

The embodiments of the specification illustrate how an external data transceiver can be used to couple a wireless communication device to a physical device. By using this external data transceiver, a user can advantageously enjoy the benefits of a relatively high data transfer rate when using the physical device. Moreover, this external data transceiver and wireless communication device provide a cost-effective way to couple the physical device to the processing device.

Figure 1:
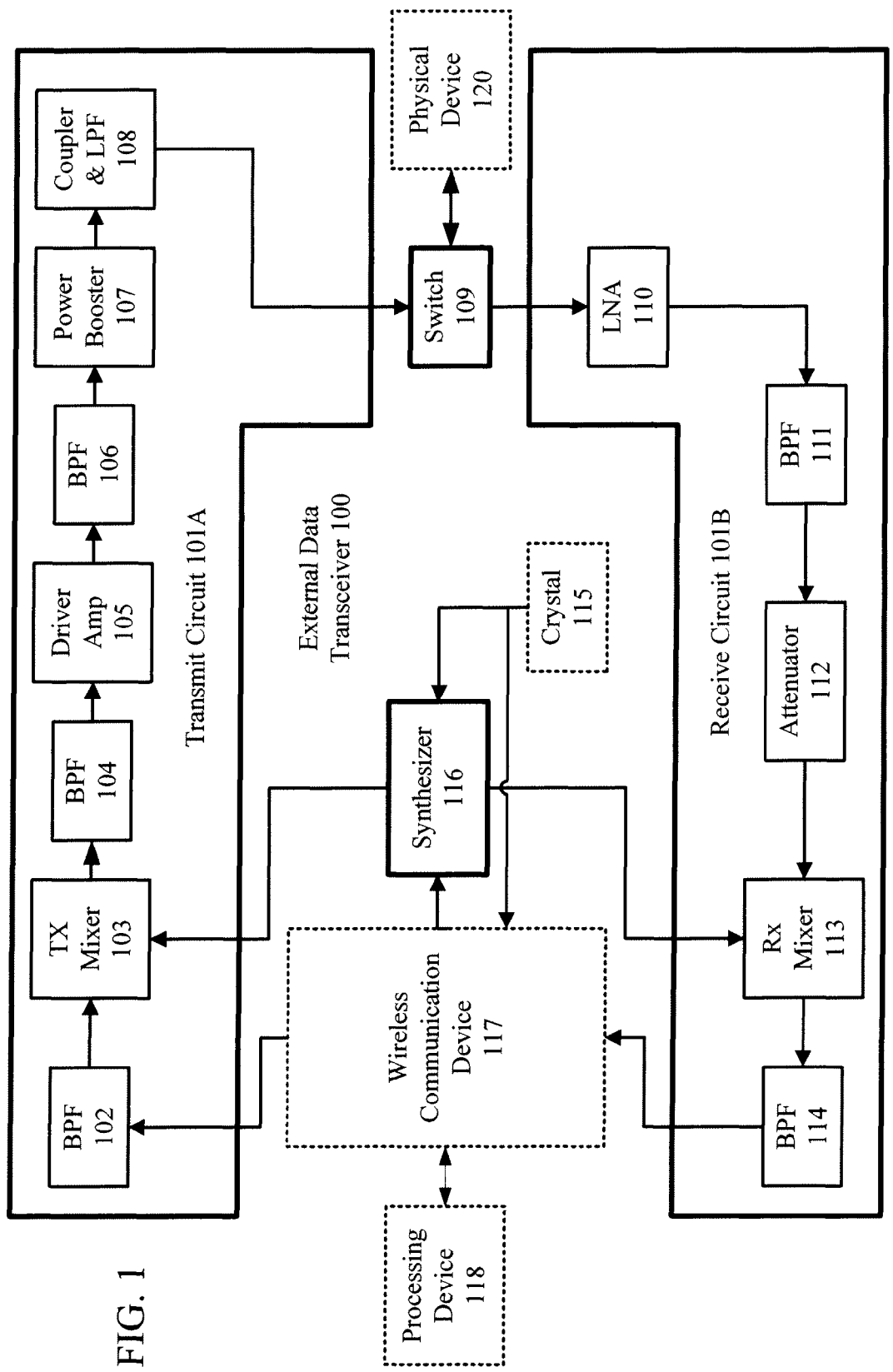
FIG. 1 is a block diagram illustrating an external data transceiver that can advantageously provide frequency shifting between a wireless communication device and a physical device.

FIG. 1 illustrates an external data transceiver 100 including a transmit circuit 101A, a receive circuit 101B, a synthesizer 116, and a switch 109. As shown in FIG. 1, external data transceiver 100 can be coupled to a wireless communication device (via its antenna ports). Wireless communication device 117, which may be implemented using one or more integrated circuits (ICs), is configured to transmit and receive RF data. Notably, wireless communication device 117 may be coupled to a processing device 118, e.g. a central processing unit (CPU), a server, a personal digital assistant, a router, or another processing device. In this configuration, processing device 118 can send and receive data to external data transceiver 100 via wireless communication device 117.

In one embodiment, wireless communication device 117 may also be coupled to synthesizer 116 to configure some operational settings of synthesizer 116. Synthesizer 116, which is described in further detail in reference to FIG. 7, may create one or more local oscillator frequencies for use within transmit circuit 101A and/or receive circuit 102B. Synthesizer 116 may be further coupled to a crystal 115, which can provide a reference frequency. In one embodiment, crystal 115 may also provide a clock frequency for wireless communication device 117.

Transmit circuit 101A and receive circuit 101B may be coupled to switch 109, which can provide a physical interface between external data transceiver 100 and a physical device 120. Specifically, switch 109 can selectively couple physical device 120 to either transmit circuit 101A or receive circuit 101B. In one embodiment, physical device 120 may include a cable. In one embodiment, switch 109 may include an impedance transformer to allow the impedance of physical device 120 to be matched to the combined impedance of transmit circuit 101A and receive circuit 101B. For example, if the impedance of the cable is seventy-five ohms and the impedance of the frequency of the transmit and the receive circuits are fifty ohms, then the impedance transformer may enable the cable to be coupled to the transmit or the receive circuits by reducing impedance mismatch.

Transmit circuit 101A receives the transmit data from wireless communication device 117 and shifts the frequency of the transmit data so that the resulting frequency-shifted data may be carried through physical device 120 instead of being transmitted through the air. In one embodiment, the transmit data may be between approximately 2.3-2.7 GHz and the frequency-shifted transmit data may be between approximately 900-1100 MHz. Transmit circuit is described in greater detail in reference to FIGS. 2, 3, and 4.

In a similar fashion, receive circuit 101B receives data from physical device 120. This received data is frequency shifted so that the resulting data may be processed by wireless communication device 117. In one embodiment, the frequency-shifted receive data may be between approximately 900-1100 MHz and the resulting data may be between approximately 2.3-2.7 GHz. Receive circuit 101B is described in greater detail in reference to FIGS. 5 and 6.

Figure 2:
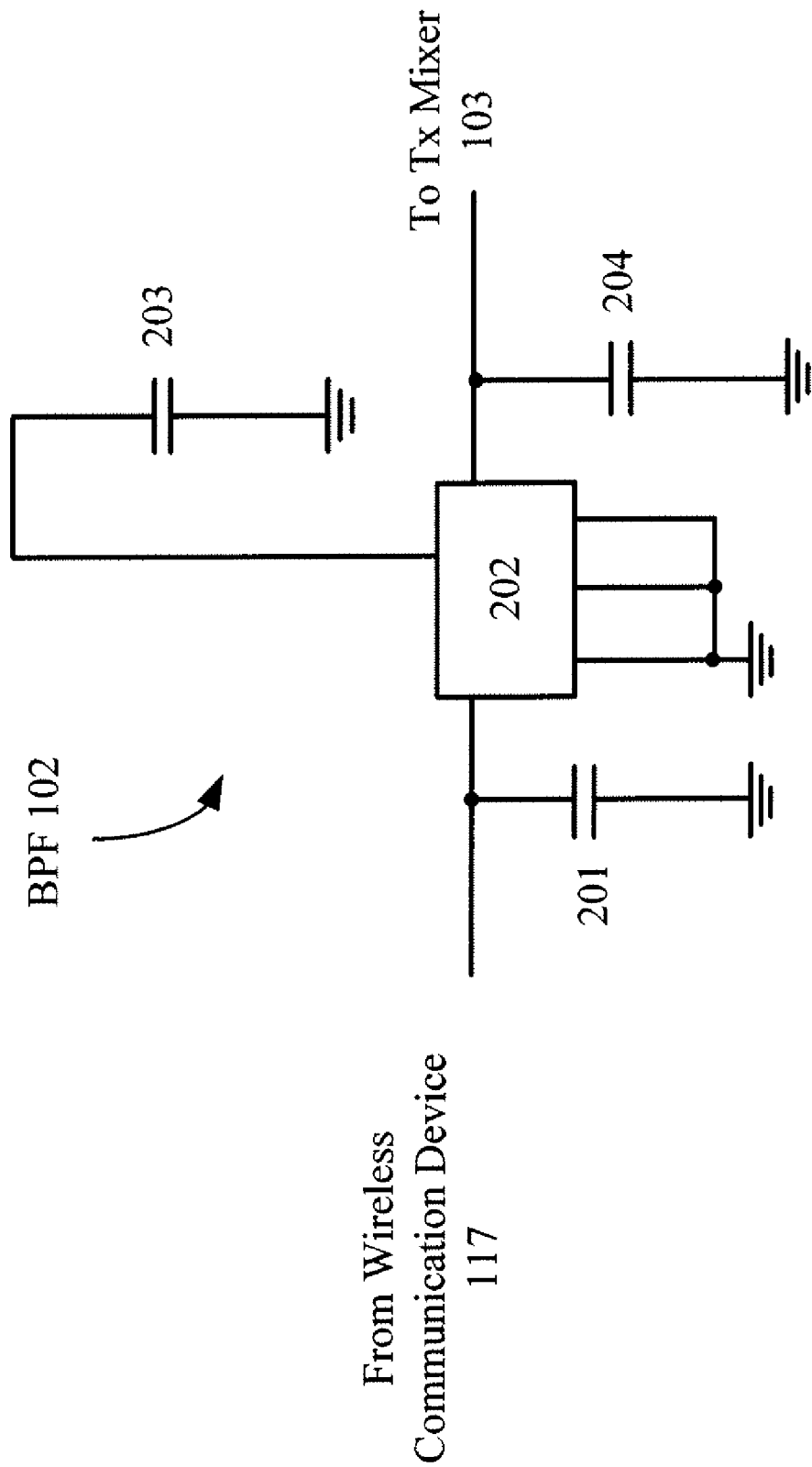
FIGS. 2, 3, and 4 are schematics of an exemplary embodiment of the transmit circuit of FIG. 1.
Figure 3:
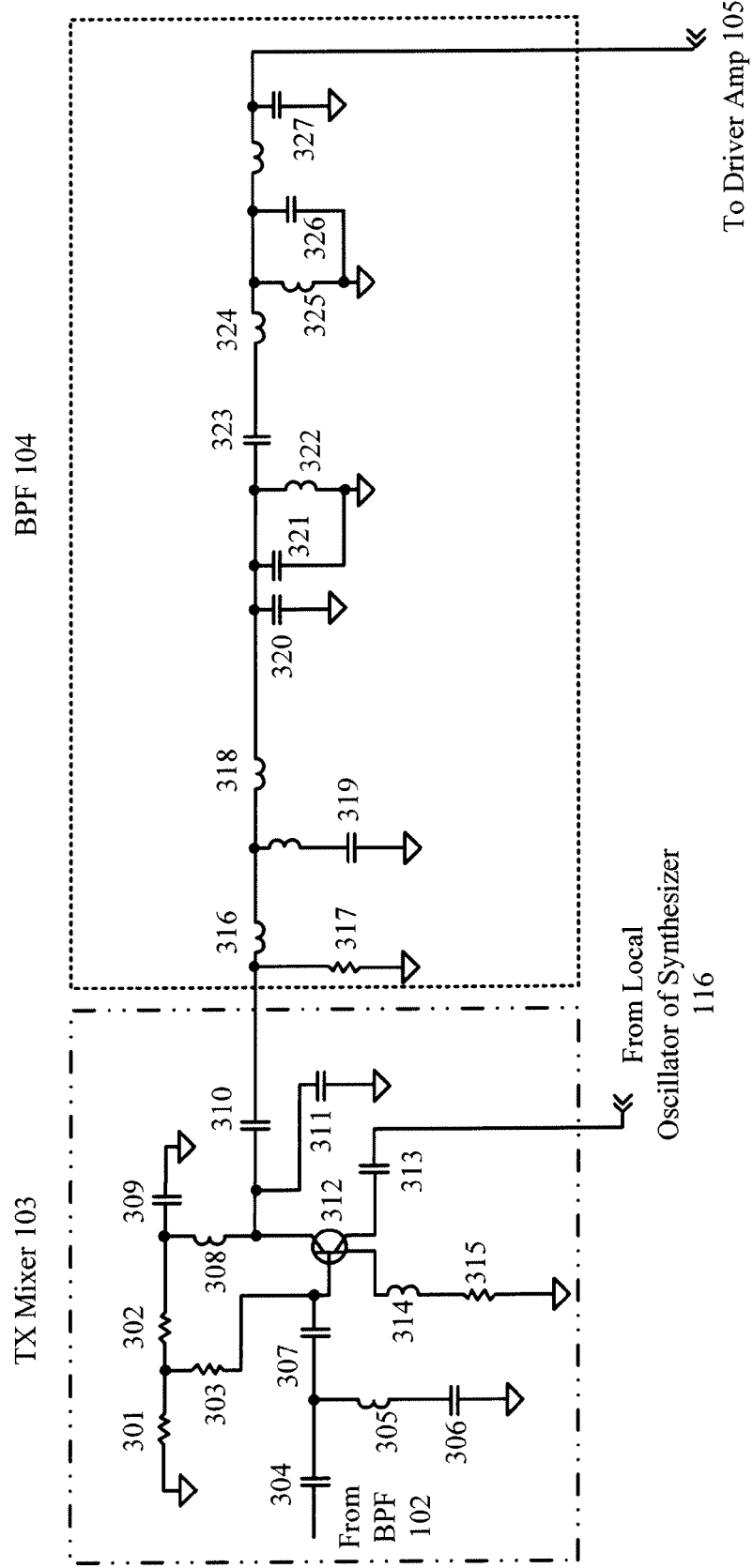
Figure 4:
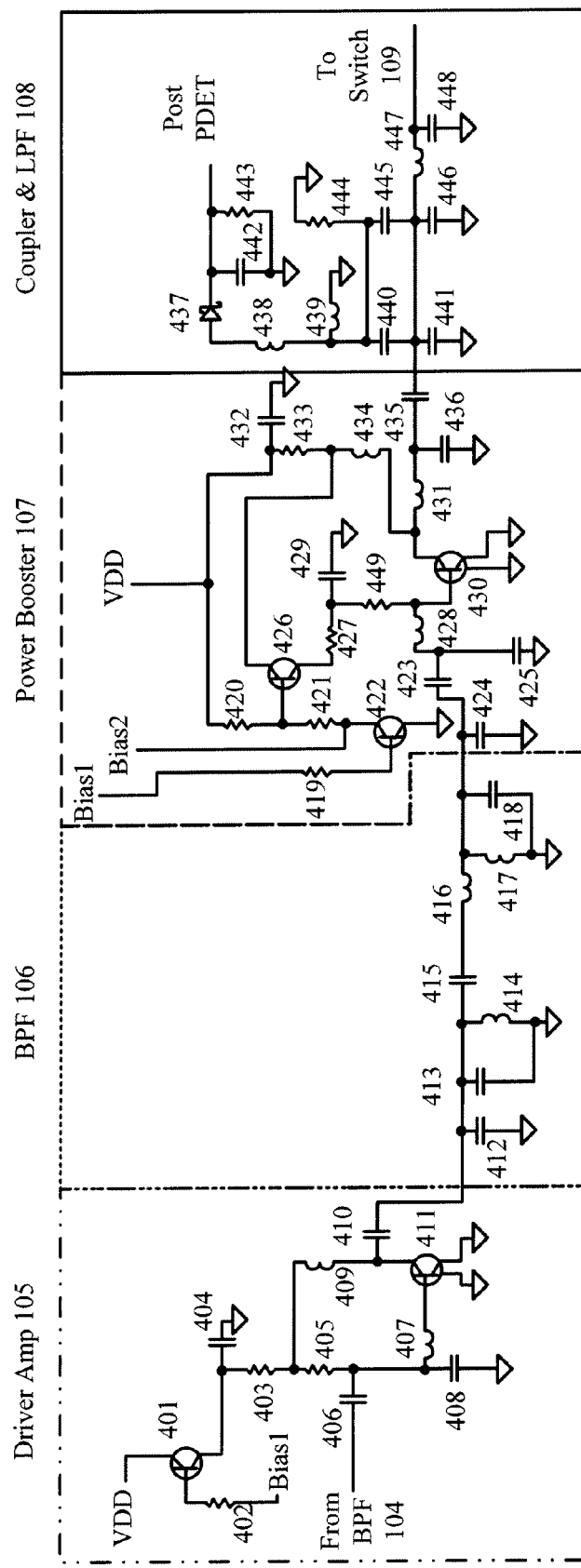

FIGS. 2, 3, and 4 illustrate exemplary components of transmit circuit 101A (FIG. 1). In this embodiment, transmit circuit 101A includes three transmit band-pass filters 102/104/106, a transmit mixer (down-mixer) 103, a driver amplifier 105, a power booster 107, and a coupler and low-pass filter 108. In one embodiment, transmit circuit 101A can be implemented using physical, not integrated, components.

FIG. 2 illustrates one embodiment of transmit band-pass filter (BPF) 102, which receives the transmit data from wireless communication device 117. In one embodiment, transmit band-pass filter 102 may have a pass band between 2.3-2.6 GHz, may have −30 dB of attenuation at frequencies at and below 1.6 GHz and −30 dB of attenuation at frequencies at and above 3.2 GHz, and may be implemented by a comb filter comprising printed circuit board (PCB) elements such as PCB inductors, stripline and the like.

Transmit mixer 103 receives the filtered output of BPF filter 102 and shifts the frequency of that filtered output from between approximately 2.3-2.7 GHz to between approximately 900-1100 MHz by mixing the filtered output with a local oscillator frequency from synthesizer 116. In one embodiment, transmit mixer 103 may be implemented as an active mixer based on a bipolar transistor. In another embodiment, transmit mixer 103 may be implemented with primarily passive components. One embodiment of transmit mixer 103 with primarily passive components is shown within the dashed-dotted line box in FIG. 3. The output of transmit mixer 103 is provided to BPF 104.

In one embodiment, BPF 104 may have a pass band between 900 and 1100 MHz, may have −10 dB of attenuation at frequencies at and below 800 MHz and −20 dB of attenuation at frequencies at and above 1300 MHz, and may be implemented by an elliptic filter. One embodiment of BPF 104 is shown within the dotted line box in FIG. 3.

The transmit circuit 101A continues as the output of BPF 104 is provided to the input of driver amplifier (amp) 105. Driver amp 105 may be implemented as an amplifier with approximately 20 dB of gain. One embodiment of driver amp 105 is shown within the dashed/dotted line box of FIG. 4. The output of driver amp 105 is provided to the input of BPF 106. In one embodiment, BPF 106 may have a pass band between 900 and 110 MHz, may have −10 dB of attenuation at frequencies at and below 800 MHz and −20 dB of attenuation at frequencies at and above 1300 MHz, and may be implemented by an elliptic filter. One embodiment of BPF 106 is shown within the dotted line box of FIG. 4. The output of BPF 106 may be provided to power booster 107. Power booster 107 may boost the output of BPF 106 with a gain of approximately 20 dB and may produce an output power of about 15 dBm. One embodiment of power booster 107 is shown within the dashed line box in FIG. 4. Bias voltages (denoted as Bias1 and Bias2 in FIG. 4 may be provided to operate transistors 422 and 426 in a non-saturated mode.

The output of power booster 107 may be provided to coupler and low-pass filter (LPF) 108. Coupler and LPF 108 couples and filters the output of power booster 107 for switch 109. In one embodiment, coupler and LPF 108 may include printed circuit traces configured as strip line, micro-strip, differential matched pair, or other trace configurations. One embodiment of coupler and LPF 108 is shown by the solid line box in FIG. 4. In one embodiment, the frequency response of coupler and LPF 108 may have greater than 30 dB of attenuation at 1800 MHz. In another embodiment, coupler and LPF 108 may also include circuitry for a power detector. Such power detector may generate a DC voltage (i.e. post PDET) proportional to the output power of the transmit circuit. The output power may be monitored by wireless communication device 117.

Figure 5:
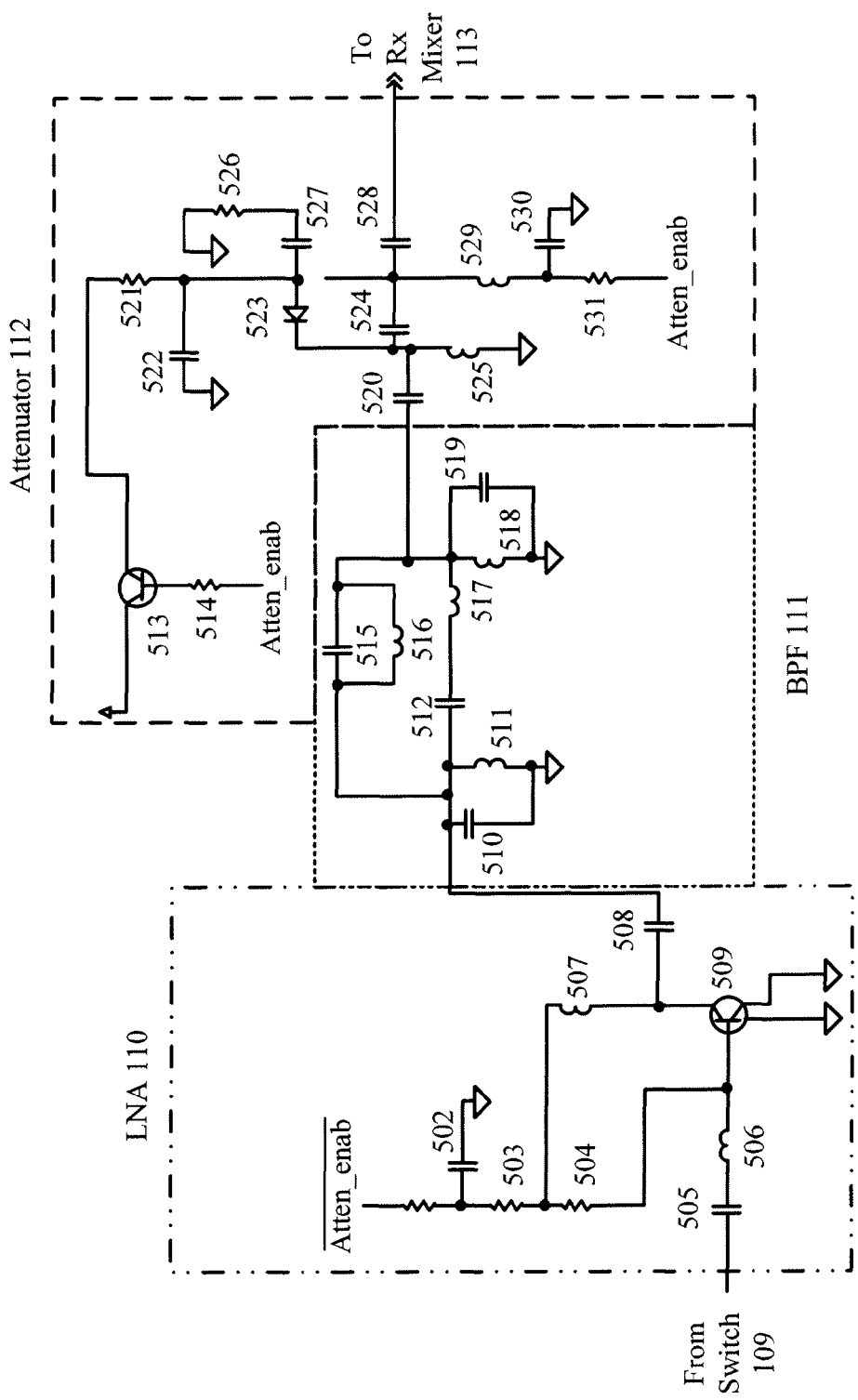
FIGS. 5 and 6 are schematics of an exemplary embodiment of the receive circuit of FIG. 1.
Figure 6:
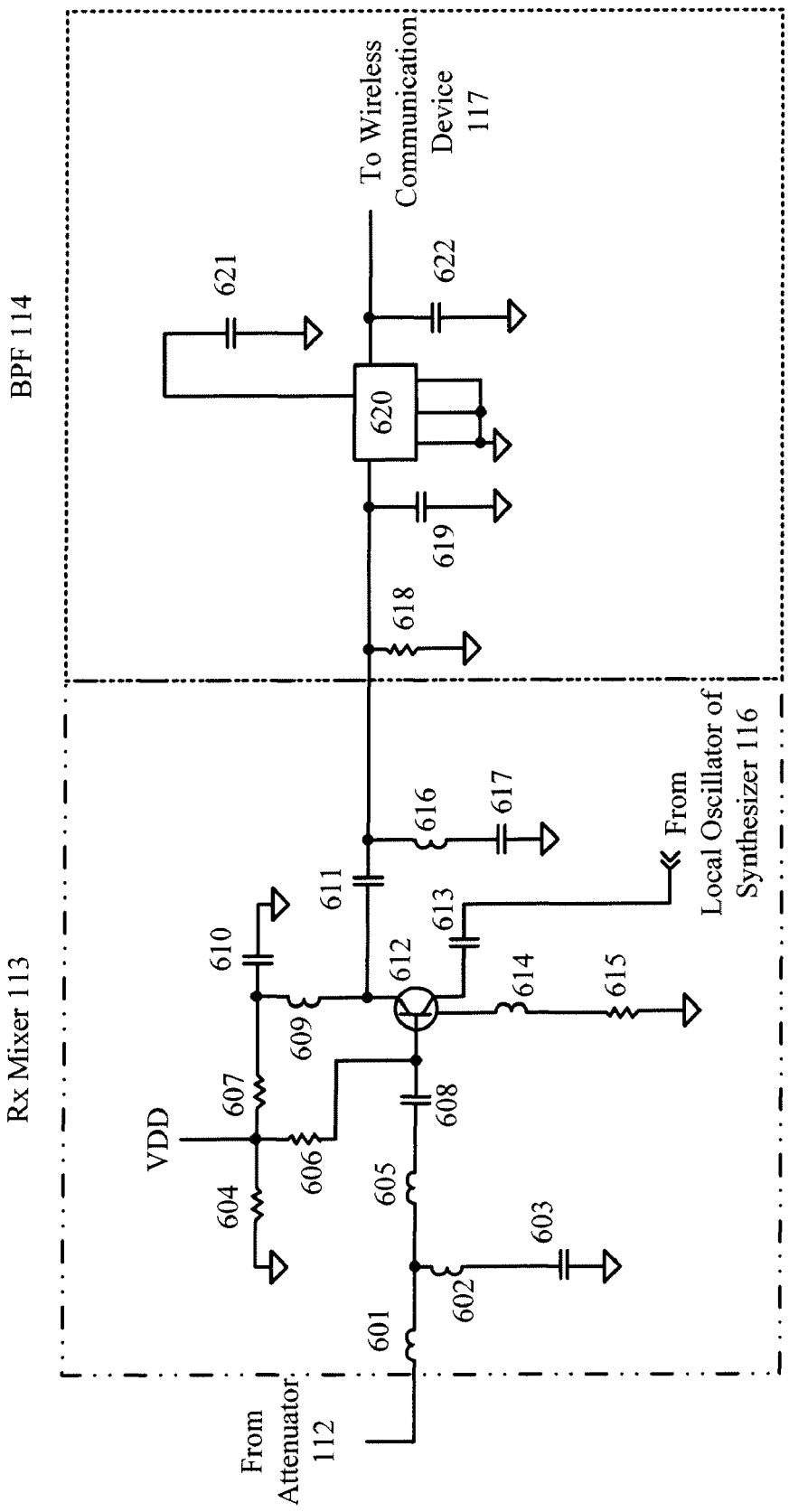

FIGS. 5 and 6 illustrate exemplary components of receive circuit 101B of FIG. 1. In this embodiment, receive circuit 101B may include two receive BPFs 111/114, a low noise amplifier (LNA) 110, an attenuator 112, and a receive mixer (up-mixer) 113. In one embodiment, receive circuit 101B can be implemented using physical, not integrated, components.

Receive data is coupled through switch 109 to LNA 110. In one embodiment, LNA 110 may increase the output of the receive data with a gain of approximately 20 dB and may be implemented with a bipolar transistor. One embodiment of LNA 110 is shown within the dashed/dotted line box in FIG. 5. The output of LNA 110 is provided to BPF 111.

In one embodiment, BPF 111 may have a pass band between 900 and 1100 MHz, may have −10 dB of attenuation at frequencies at and below 800 MHz and −20 dB of attenuation at frequencies at and above 1300 MHz, and may be implemented by an elliptic filter. One embodiment of BPF 111 is shown within the dotted line box in FIG. 5. The output of BPF 111 is provided to the input of attenuator 112.

Note that attenuator 112 is optional and may be used to reduce the amplitude of the filtered frequency shifted receive data. One embodiment of attenuator 112 is shown within the dashed line box in FIG. 5. In one embodiment, effects of the attenuator may be bypassed by setting a control node to a particular voltage level. In this example, Atten_enab (and its compliment) may be set to a first voltage level to enable attenuation or a second voltage level to disable attenuation. If, for a particular design, attenuation is not required, attenuator 112 need not be included in receive circuit 101B. In another embodiment, attenuator 112 may be designed so that one or more components may be removed and/or replaced with other components to disable the attenuation characteristic. For example, inductors 525 and 529 and diode 523 may be removed and capacitors 520, 524 and 528 may be removed and replaced with zero ohm resistors to bypass the attenuator 112. The output of attenuator 112 may be provided to the input of receive mixer 113.

Receive mixer 113 shifts the frequency of the receive data from between approximately 900-1100 MHz to between approximately 2.3-2.7 MHz by mixing the receive data from the attenuator 315a with a local oscillator frequency from synthesizer 116. In one embodiment, receive mixer 113 may be implemented as an active mixer based on a bipolar transistor. In another embodiment, receive mixer 113 may be implemented with primarily passive components. One embodiment of receive mixer 113 is shown within the dashed/dotted line box in FIG. 6. The output of receive mixer 113 may be provided to the input of BPF 114.

In one embodiment, BPF 114 may have a pass band between 2.3 to 2.6 GHz, may have −30 dB of attenuation at frequencies at and below 1.6 GHz and −30 dB of attenuation at frequencies at and above 3.2 GHz, and may be implemented by a printed-circuit comb filter 620. One embodiment of BPF 114 is shown within the dotted line box in FIG. 6. The output of BPF 114 may be provided to wireless communication device 117.

Figure 7:
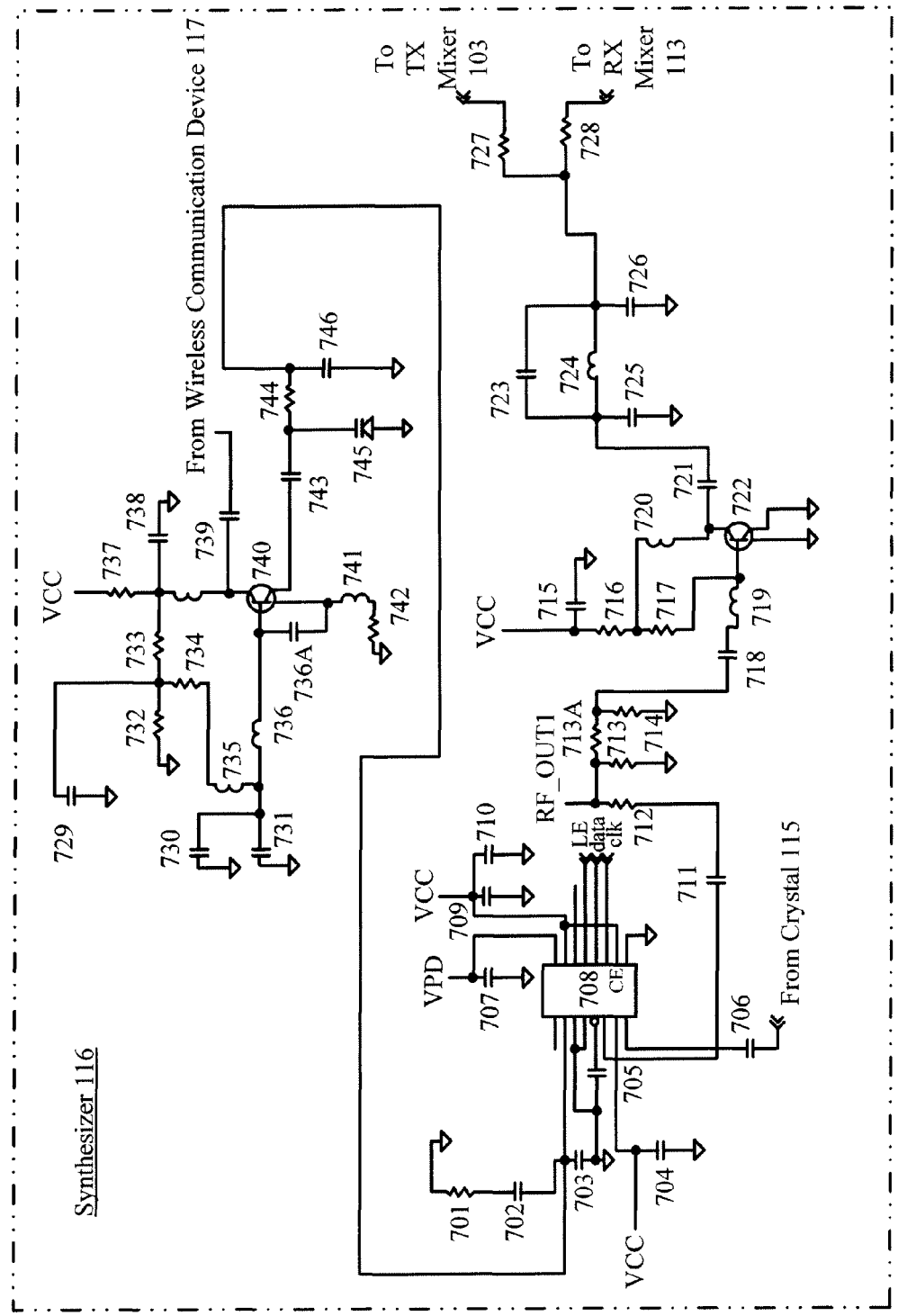
FIG. 7 is a schematic of the synthesizer of FIG. 1.

FIG. 7 illustrates an exemplary synthesizer 116, which may be coupled to wireless communication device 117, crystal 115, transmit mixer 103, and receive mixer 113. As indicated in FIG. 1, crystal 115 may provide a reference frequency for synthesizer 116 and wireless communication device 117. The outputs of synthesizer 116 may be provided to transmit mixer 103 and receive mixer 113. In one embodiment, synthesizer 116 may include a voltage controlled oscillator (VCO) and phase locked loop (PLL) that enables synthesizer 116 to produce local oscillator frequencies between about 1350 to 1650 MHz. One embodiment of synthesizer 116 is shown within the dashed/dot line box in FIG. 7.

The selection of the frequency of the local oscillator outputs to receive mixer 113 and transmit mixer 103 may be determined by the frequency of the transmit data and the desired frequency of the receive data. These frequencies also determine the frequency of the spurs, which may have to be suppressed by one or more of the BPFs within transmit circuit 101A and receive circuit 101B. In one embodiment, the closest spurs may be described by the equations below:

$$F_{spur1}=(4*F_{LO})-(2*F_{RF}) \qquad \text{(eq. 1)}$$

$$F_{spur2}=((4*F_{LO})-(2*F_{RF}))/2 \qquad \text{(eq. 2)}$$

where $F_{spurN}$ is the frequency of the spur, $F_{LO}$ is the frequency of the local oscillator output and $F_{RF}$ is the frequency of the transmit or receive data. In one embodiment, the out-of-band spurs may be required to be no greater than −30 dBm.

Equations 1 and 2 may determine the frequencies of the spurs. In one embodiment, if the data transceiver is configured to process frequency shifted transmit and receive data at a frequency of about 1000 MHz, then the $F_{LO}$ may be 1.6 GHz and the $F_{RF}$ may be 2.6 GHz. In this case, the frequency of the spurs would be about 600 and 1200 MHz. In another embodiment, if the data transceiver is configured to process frequency-shifted transmit and receive data at a frequency of about 1100 MHz, then the $F_{LO}$ may be 1.5 GHz and the $F_{RF}$ may be 2.6 GHz. In this case, the frequency of the spurs would be about 400 and 800 MHz. In yet another embodiment, if data transceiver 100 is configured to process frequency shifted transmit and receive data at a frequency of about 900 MHz, then the $F_{LO}$ may be 1.6 GHz and the $F_{RF}$ may be 2.5 GHz. In this case, the frequency of the spurs would be about 700 and 1400 MHz.

In another embodiment, the frequency of the spurs may be in the pass-band, but be relatively lower in power than the frequency shifted transmit and receive data. For example, if external data transceiver 100 is configured to process frequency-shifted transmit and receive data at a frequency of about 1100 MHz, then the $F_{LO}$ may be 1.45 GHz and the $F_{RF}$ may be 2.55 GHz. In this case, a frequency of a spur would be at about 1050 MHz.

In yet another embodiment, data transceiver 100 may be configured so that the frequency of the spur is approximately the frequency of the frequency shifted transmit and receive data, but may be 40 dB lower in power than the power of the frequency shifted data. In this case, $$F_{LO} = (1.5 * F_{OUT})\qquad\text{(eq. 3)}$$

$$F_{RF} = (2.5 * F_{OUT})\qquad\text{(eq. 4)}$$

where $F_{OUT}$ is the frequency of the frequency shifted data.

External data transceiver 100 can advantageously couple physical device 120 to wireless communication device 117 (and thus also to processing device 118). As noted above, external data transceiver 100 may be used to shift the frequency of the transmit data from wireless communication device 117 to a relatively lower frequency, thereby enabling the frequency-shifted data to be carried by physical device 120. Moreover, external data transceiver 100 may be used to shift the frequency of the receive data from physical device 120 to a relatively higher frequency, thereby enabling the frequency-shifted data to be carried by wireless communication device 117. In this manner, wireless communication device 117 can perform as if receiving standard wireless RF signals. That is, external data transceiver 100 is effectively transparent to wireless communication device 117.

Figure 8B:
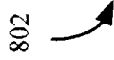

Because wireless communication device 117 may have a relatively low cost, the cost of data transceiver 100 may also be relatively low. Also, in one embodiment, the component costs of receive circuit 101B and transmit circuit 101A may be relatively low because the component parts selected may be widely available and may also have a relatively low cost. FIGS. 8A and 8B list exemplary implementation values for the components of transmit circuit 101A and receive circuit 101B. Note that any component values designated "XX" are optional components that may be used in other embodiments, wherein such component values may be determined in the context of the specific embodiment.

Although illustrative embodiments of the invention have been described in detail herein with reference to the accompanying figures, it is to be understood that the invention is not limited to those precise embodiment. They are not intended to be exhaustive or to limit the invention to the precise forms disclosed. As such, many modifications and variations will be apparent. Accordingly, it is intended that the scope of the invention be defined by the following Claims and their equivalents.

The invention claimed is:

1. An external data transceiver for coupling between a wireless communication device and a physical device, the external data transceiver comprising:
 a transmit circuit for frequency shifting a received signal having a first frequency from the wireless communication device to a second frequency receivable by the physical device;
 a receive circuit for frequency shifting a received signal having a third frequency from the physical device to a fourth frequency receivable by the wireless communication device; and
 a switch for selectively coupling one of the transmit circuit and the receive circuit to the physical device,
 wherein the transmit circuit includes:
 a first band-pass filter for filtering the received signal;
 a transmit mixer for mixing a filtered signal from the first bandpass filter with a local oscillator signal, thereby generating a second frequency signal;
 a driver amplifier for amplifying the second frequency signal, thereby generating an amplified signal;
 at least a second band-pass filter for filtering at least one of the second frequency signal and the amplified signal;
 a power booster for boosting a power of the amplified signal; and
 a coupler and low pass filter for filtering an output of the power booster and providing that filtered output to the switch.

2. The external data transceiver of claim 1, wherein the first band-pass filter has a pass band between 2.3-2.6 GHz.

3. The external data transceiver of claim 1, wherein the first band-pass filter has −30 dB of attenuation at and below 1.6 GHz, and −30 dB of attenuation at frequencies at and above 3.2 GHz.

4. The external data transceiver of claim 1, wherein the first band-pass filter is implemented by a comb filter.

5. The external data transceiver of claim 4, wherein the comb filter includes printed circuit board (PCB) elements.

6. The external data transceiver of claim 1, wherein the first frequency signal is between 2.3-2.7 GHz and the second frequency signal is between 900-1100 MHz.

7. The external data transceiver of claim 6, wherein the transmit mixer is implemented as an active mixer based on a bipolar transistor.

8. The external data transceiver of claim 6, wherein the transmit mixer is implemented primarily with passive components.

9. The external data transceiver of claim 1, wherein the second band-pass filter has a pass band between 900 and 1100 MHz.

10. The external data transceiver of claim 9, wherein the second band-pass filter has −10 dB of attenuation at frequencies at and below 800 MHz, and −20 dB of attenuation at frequencies at and above 1300 MHz.

11. The external data transceiver of claim 1, wherein the second band-pass filter is implemented by an elliptic filter.

12. The external data transceiver of claim 1, wherein the driver amplifier has approximately 20 dB of gain.

13. The external data transceiver of claim 12, wherein the second band pass filter has a pass band between 900 and 110 MHz.

14. The external data transceiver of claim 12, wherein the second band pass filter has −10 dB of attenuation at frequencies at and below 800 MHz, and −20 dB of attenuation at frequencies at and above 1300 MHz.

15. The external data transceiver of claim 12, wherein the second band pass filter is implemented by an elliptic filter.

16. The external data transceiver of claim 1, wherein the power booster boosts the amplified signal with a gain of approximately 20 dB and produces an output power of about 15 dBm.

17. The external data transceiver of claim 3, wherein the power booster receives bias voltages to ensure operation of power booster components in a non-saturated mode.

18. The external data transceiver of claim 3, wherein the coupler and the low pass filter include printed circuit traces configured as one of strip lines, micro-strips, a differential matched pair, and another trace configuration.

19. The external data transceiver of claim 3, wherein a frequency response of the coupler and the low pass filter has greater than 30 dB of attenuation at 1800 MHz.

20. The external data transceiver of claim 3, wherein the coupler and the low pass filter include circuitry for a power detector.

21. The external data transceiver of claim 3, wherein the power detector generates a DC voltage proportional to an output power of the transmit circuit.

22. The external data transceiver of claim 3, wherein the output power is monitored by the wireless communication device.

23. A method for allowing communication between a wireless communication device and a physical device, the method comprising:

frequency shifting a received signal having a first frequency from the wireless communication device to a second frequency receivable by the physical device; and frequency shifting a received signal having a third frequency from the physical device to a fourth frequency receivable by the wireless communication device; and selectively allowing one of frequency shifting from the wireless communication device to the physical device and frequency shifting from the physical device to the wireless communication device, wherein frequency shifting the received signal having the first frequency from the wireless device to the second frequency receivable by the physical device includes:

filtering the received signal from the wireless communication device, thereby generating a first filtered signal;

mixing the first filtered signal with a local oscillator signal, thereby generating a second frequency signal;

amplifying the second frequency signal, thereby generating an amplified signal;

filtering at least one of the second frequency signal and the amplified signal;

boosting the amplified signal, thereby generating a boosted signal;

filtering the boosted signal, thereby generating a final filtered signal; and providing the final filtered signal to the physical device.

* * * * *